(12) United States Patent
Abou Ghaida (10) Patent No.: US 8,031,110 B2
(45) Date of Patent: Oct. 4, 2011

(54) POSITION BIAS AMELIORATION METHOD AND APPARATUS IN GNSS RECEIVER

(75) Inventor: Hassan Abou Ghaida, Cupertino, CA (US)

(73) Assignee: Trimble Navigation Ltd., Sunnyvale, CA (US)

( * ) Notice: Subject to any disclaimer, the term of this patent is extended or adjusted under 35 U.S.C. 154(b) by 466 days.

(21) Appl. No.: 12/317,616

(22) Filed: Dec. 27, 2008

(65) Prior Publication Data

US 2010/0164788 A1    Jul. 1, 2010

(51) Int. Cl.
*G01S 19/40* (2010.01)
(52) U.S. Cl. .................................................. 342/357.23
(58) Field of Classification Search ............. 342/357.23, 342/357.34, 357.52
See application file for complete search history.

(56) References Cited

U.S. PATENT DOCUMENTS 5,590,043 A * 12/1996 McBurney ............... 342/357.29
6,810,324 B1   10/2004 Nadkarni

\* cited by examiner

*Primary Examiner* — Thomas H. Tarcza
*Assistant Examiner* — Fred H Mull
(74) *Attorney, Agent, or Firm* — Boris G. Tankhilevich (57) ABSTRACT

A method of eliminating user position biases caused by satellite constellation changes or differential signal gain/loss is provided. The method comprises: (A) substantially continuously determining an unbiased user's position by using a radio receiver"; (B) detecting a "detectable event" by using the radio receiver; (C) measuring a bias caused by the detectable event; (D) performing an update process by accumulating each bias caused by at least one detectable event to generate an accumulated bias; and (E) eliminating the accumulated bias at each Epoch by using a correction process.

25 Claims, 8 Drawing Sheets

POSITION BIAS AMELIORATION METHOD AND APPARATUS IN GNSS RECEIVER

TECHNICAL FIELD

The technology relates to the field of satellite navigation.

BACKGROUND

A detectable event is herein defined as a loss or gain of one or several positioning satellites (and/or pseudolites) and a loss or gain of a differential correction signal that lead to undesirable user position biases. If user's initial position coordinates were determined by using a Weighted Least Squares (WLS) solution, these biases would appear in the form of instantaneous jumps in the Weighted Least Squares (WLS) solution. If, on the other hand, an initial position coordinates were determined by using a Kalman Filter (KF) solution, the biases would appear in the form of drifts in the Kalman Filter (KF) solution. As a result, in both situations, the positioning becomes problematic in various types of applications.

For instance, on an agricultural field, when user is trying to maintain long, parallel and straight swaths that are tightly close to one another, these position biases occur causing the vehicle to divert from its straight line path. Although, a bias might lead to a more accurate position in the absolute sense, in the agricultural (and many other applications) what is important is a relative position accuracy defined in a reference to an initial position accuracy determined at the end to a selected initial Epoch at which an initial position and its accuracy were determined by using an initial satellite (and/or pseudolites) constellation and an initial differential signal status. This initial Epoch's constellation and the initial differential signal status are hereafter referred to as truth, and all events that occur after it are considered to be problematic as all these events create biases that should be eliminated.

To deal with this task, in the case of WLS, a Position Bias Filter (PBF) was implemented in the position domain. The PBF simply tracks and calculates the WLS position biases caused by every event and accumulates them in a position bias vector that is removed from the WLS solution's position vector.

However, a PBF cannot be used with a KF solution because the KF diffuses the instantaneous position jumps, encountered in WLS, into drifts over the course of several Epochs, making it difficult to assess the biases in the position domain during these Epochs.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method of eliminating user position biases caused by satellite constellation changes or differential signal gain/loss is provided. The method comprises: (A) substantially continuously determining an unbiased user's position by using a radio receiver", and (B) detecting a "detectable event" by using the radio receiver. The unbiased user's position is determined by using an "initial transmitter constellation, wherein the detectable event causes a position bias in the initially unbiased user's position. The detectable event transitions the initial transmitter constellation into a "biased transmitter constellation". The method further comprises: (C) measuring a bias caused by the detectable event, (D) performing an update process by accumulating each bias caused by at least one detectable event to generate an accumulated bias, and (E) eliminating the accumulated bias at each Epoch by using a correction process. The bias is selected from the group consisting of: {a position bias; and a pseudo range bias}.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference will now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

In an embodiment of the technology, an unbiased user's position is determined by using a Global Navigational Satellite System (GNSS) receiver (not shown) configured to receive a plurality of navigation signals emanating from a first "initial transmitter constellation". The first "initial transmitter constellation" is selected from the group consisting of: {GPS; GLONASS; combined GPS/GLONASS; GALILEO; COMPASS (Beidou Navigation System); Global Navigational Satellite System (GNSS); and a pseudolite transmitter}.

The Global Positioning System (GPS) is a system of satellite signal transmitters that transmits information from which an observer's present location and/or the time of observation can be determined. The GPS was developed by the United States Department of Defense (DOD) under its NAVSTAR satellite program.

A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrums, L-band carrier signals: an L1 signal having a frequency $f1=1575.42$ MHz (approximately nineteen centimeter carrier wavelength) and an L2 signal having a frequency $f2=1227.6$ MHz (approximately twenty-four centimeter carrier wavelength). These two frequencies are integral multiplies $f1=1,540$ $f0$ and $f2=1,200$ $f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k=(1, 2, 24)$ is the channel or satellite number. These frequencies lay in two bands at 1.597-1.617 GHz (L1) and 1,240-1, 260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

As disclosed in the European Commission "White Paper on European transport policy for 2010", the European Union will develop an independent satellite navigation system GALILEO as a part of a global navigation satellite infrastructure (GNSS). The GALILEO system is based on a constellation of 30 satellites and ground stations providing information concerning the positioning of users in many sectors such as transport (vehicle location, route searching, speed control, guidance systems, etc.), social services (e.g. aid for the disabled or elderly), the justice system and customs services (location of suspects, border controls), public works (geographical information systems), search and rescue systems, or leisure (direction-finding at sea or in the mountains, etc.).

China has launched its own satellite navigation system-Beidou Navigation System by launching initially satellites Beidou 1B and Beidou 2A. The latest Beidou navigation satellite was successfully launched on 3 Feb. 2007. Till 2007, the resolution of Beidou navigation system already reached as high as 0.5 m, thus China became the second country after USA which achieved <1 m resolution.

A pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability. The complete description of the pseudolite transmitters in GPS band can be found in "Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautics and Astronautics, Inc., in 1966.

In ISM band, including 900 MHZ, 2.4 GHz, or 5.8 GHz bands, the user can own both ends of the ISM communication system. The ISM technologies are manufactured by Trimble Navigation Limited, Sunnyvale, Calif. Metricom, Los Gatos, Calif. and by Utilicom, Santa Barbara, Calif. Pseudolites as radio positioning systems can be configured to operate in ISM band.

In an embodiment of the present technology, a pseudolite can be implemented by using a ground based transmitter that transmits in the GPS band such as the Terralite system designed by Novariant. The Novariant's Terralite XPS system provides mine managers with direct control of the reliability of their positioning systems and helps cover gaps in GPS coverage. The Terralite XPS system is comprised of a network of transmitting stations (Terralites) and mobile receivers. The Terralites broadcast the XPS positioning signal throughout mines to 12-channel, tri-frequency mobile receivers (L1, L2, XPS). The 241×173×61-millimeter Terralite receivers weigh 4.5 pounds and utilize 9 to 32 volts DC at 22 watts. In XPS mode reported position accuracy is 10 centimeters horizontal and 15 centimeters vertical. Novarinat is located at Menlo Park, Calif., United States.

In an embodiment of the technology, wherein a user is equipped with a differential GNSS receiver capable of receiving the differential correction signals that allows to improve an accuracy of the position solution, an unbiased user's position is determined by using a second "initial transmitter constellation". The second "initial transmitter constellation" is selected from the group consisting of: {GPS; GLONASS; combined GPS/GLONASS; GALILEO; COMPASS (Beidou Navigation System); Global Navigational Satellite System (GNSS); a pseudolite transmitter; a Base Station; a Virtual Reference Base Station (VRS); and Wide Area Augmentation System (WAAS)}. The second "initial transmitter constellation" will be further referred to as the "initial transmitter constellation".

In an embodiment of the technology, the fixed Base Station (BS) placed at a known location determines the range and range-rate measurement errors in each received GNSS signal and communicates these measurement errors as corrections to be applied by local users. The Base Station (BS) has its own imprecise clock with the clock bias CBBASE. As a result, the local users are able to obtain more accurate navigation results relative to the Base Station location and the Base Station clock. With proper equipment, a relative accuracy of 5 meters should be possible at distances of a few hundred kilometers from the Base Station.

In an embodiment of the technology, the differential GNSS receiver (not shown) can be implemented by using a TRIMBLE Ag GPS-132 receiver that obtains the GPS differential corrections from the U.S. Coast Guard service free in 300 kHz band if it is placed within (2-300) miles from the U.S. Coast Guard Base Station. The accuracy of this differential GPS method is about 50 cm.

In an embodiment of the technology, the GPS differential corrections can be obtained from the Wide Area Augmentation System (WAAS). The WAAS system includes a network of Base Stations that uses satellites (initially geostationary satellites-GEOs) to broadcast GPS integrity and correction data to GPS users. The WAAS provides 000 a ranging signal that augments the GPS. Thus, the WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is better than 1 meter.

In an embodiment of the technology, the GPS differential corrections can be obtained from a Virtual Reference Base Station (VRS). Indeed, the Virtual Reference Base Station (VRS) is configured to deliver a network-created correction data to a multiplicity of rovers via a concatenated communications link consisting of a single cellular connection, and a radio transmission or broadcasting system. The location of the radio transmitting system can be co-located with a GPS Base Station designated as the position of the local Virtual Reference Station. This GPS Base Station determines its position using GPS, and transmits its location to the VRS via a cellular link between the local GPS Base Station and the VRS. It enables the VRS to generate differential corrections as if such differential corrections were actually being generated at the real GPS Base Station location. An article "Long-Range RTK Positioning Using Virtual Reference Stations," by Ulrich Vollath, Alois Deking, Herbert Landau, and Christian Pagels, describing VRS in more details, is incorporated herein as a reference in its entirety, and can be accessed at the following URL: http://trl.trimble.com/dscgi/ds.py/Get/File-93152/KIS2001-Paper-LongRange.pdf.

In an embodiment of the technology, a user's unbiased position solution is obtained by using a radio receiver with the implementation of either a Weighted Least Squares (WLS) algorithm or a Kalman Filter (KF), wherein a plurality of navigation signals is emanating from the "initial transmitter constellation".

In an embodiment of the technology, a detectable event is defined as an event that transitions the initial transmitter constellation into a "biased transmitter constellation".

In an embodiment of the technology, the position solution results obtained by employing either or both of these methods (a Weighted Least Squares (WLS) algorithm or a Kalman Filter (KF)), are subject to abrupt position biases if a detectable event occurs.

Figure 1:
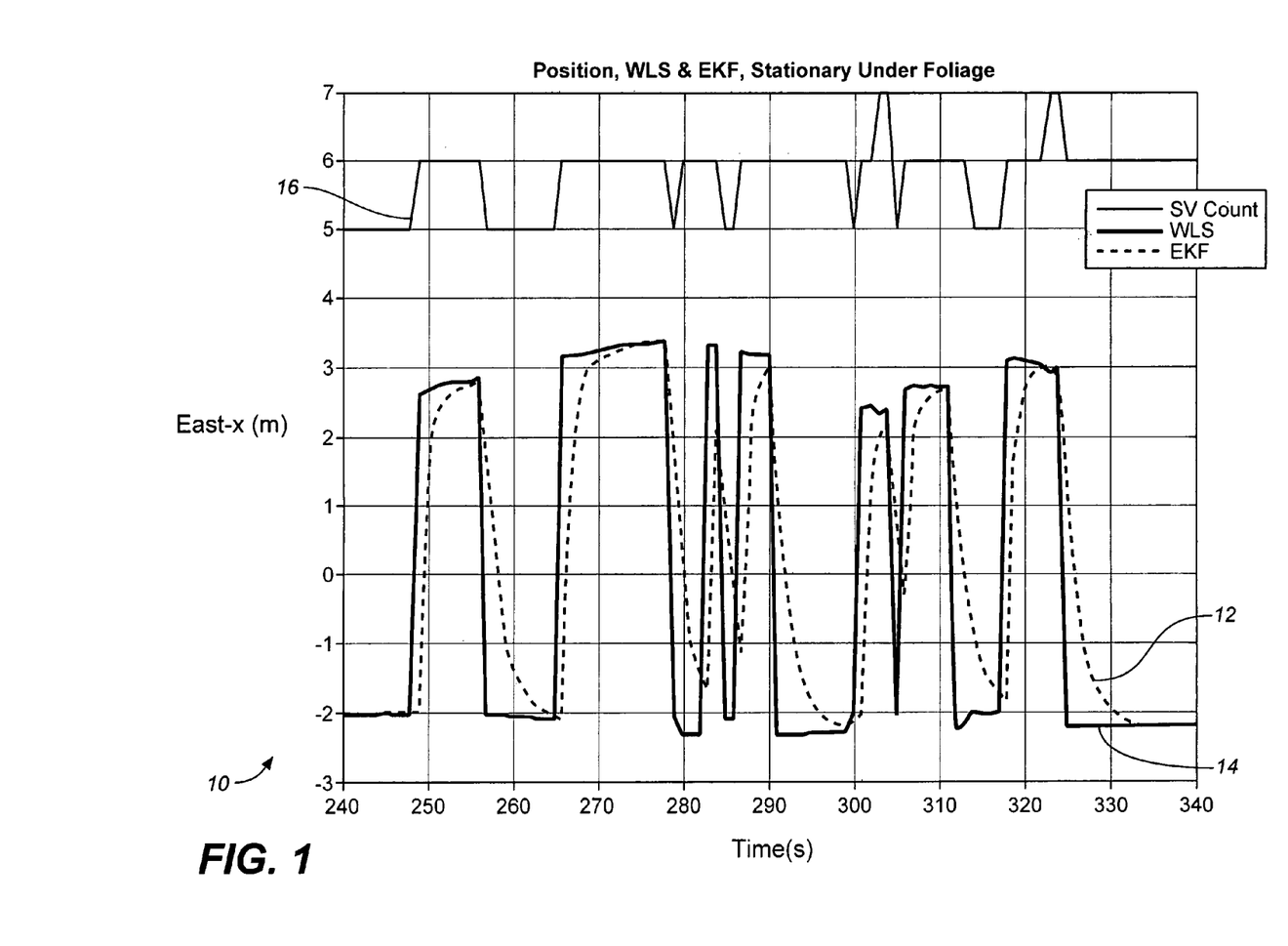
FIG. 1 is a diagram that illustrates the biases in the Weighted Least Squares (WLS) and Extended Kalman Filter (EKF) solutions that occur after satellite constellation changes take place.

In an embodiment of the technology, FIG. 1 illustrates the biases 10 in the WLS 14 and Extended Kalman Filter (EKF) 12 solutions that occur when the change in satellite vehicle (SV) count 16 (number of visible satellites) takes place. More specifically, FIG. 1 shows the changes in the satellite vehicle (SV) count 16 and the reaction of the East coordinate WLS 14 and EKF 12 position solutions of a stationary GPS receiver placed under foliage (not shown).

Figure 2:
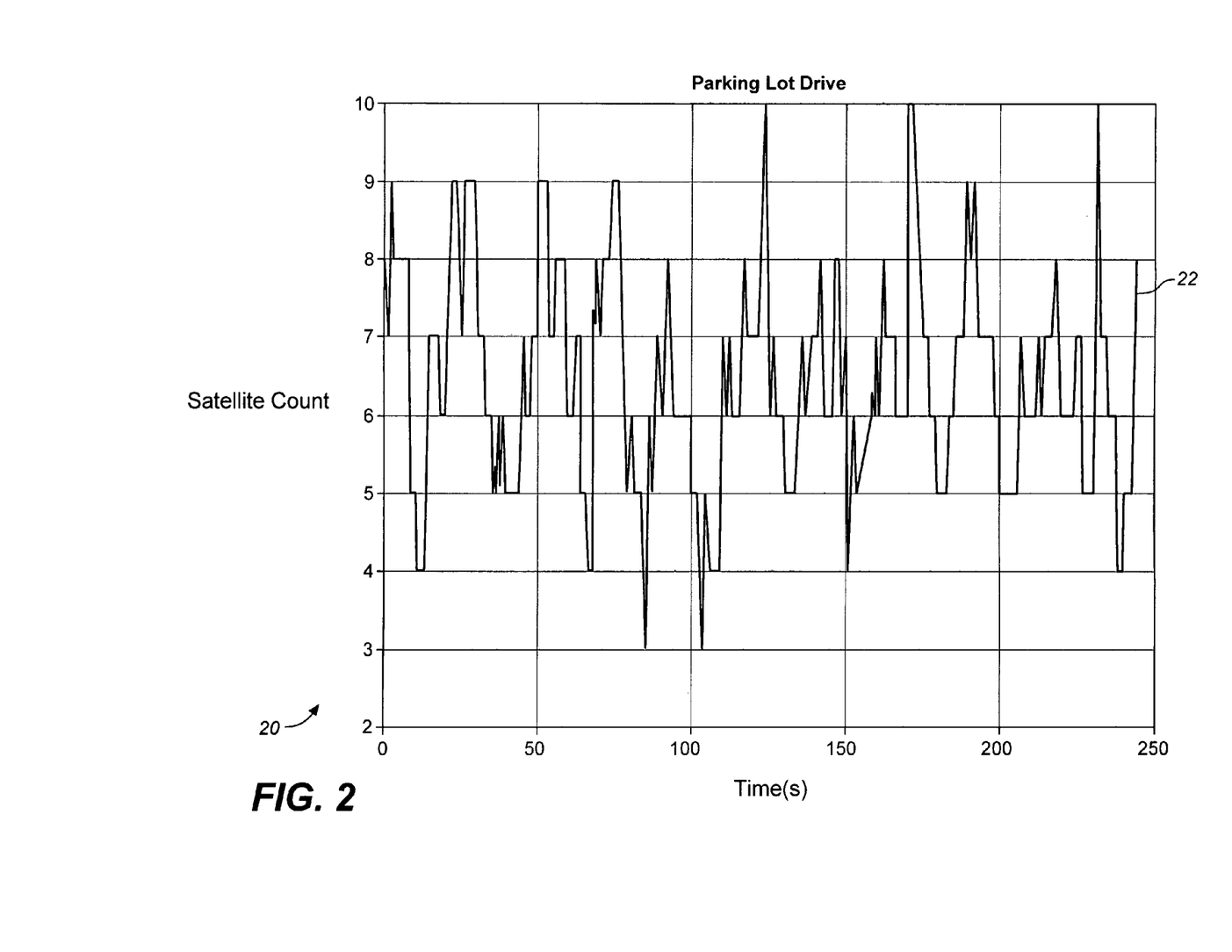
FIG. 2 shows the satellite count along the user's vehicle trajectory.
Figure 3:
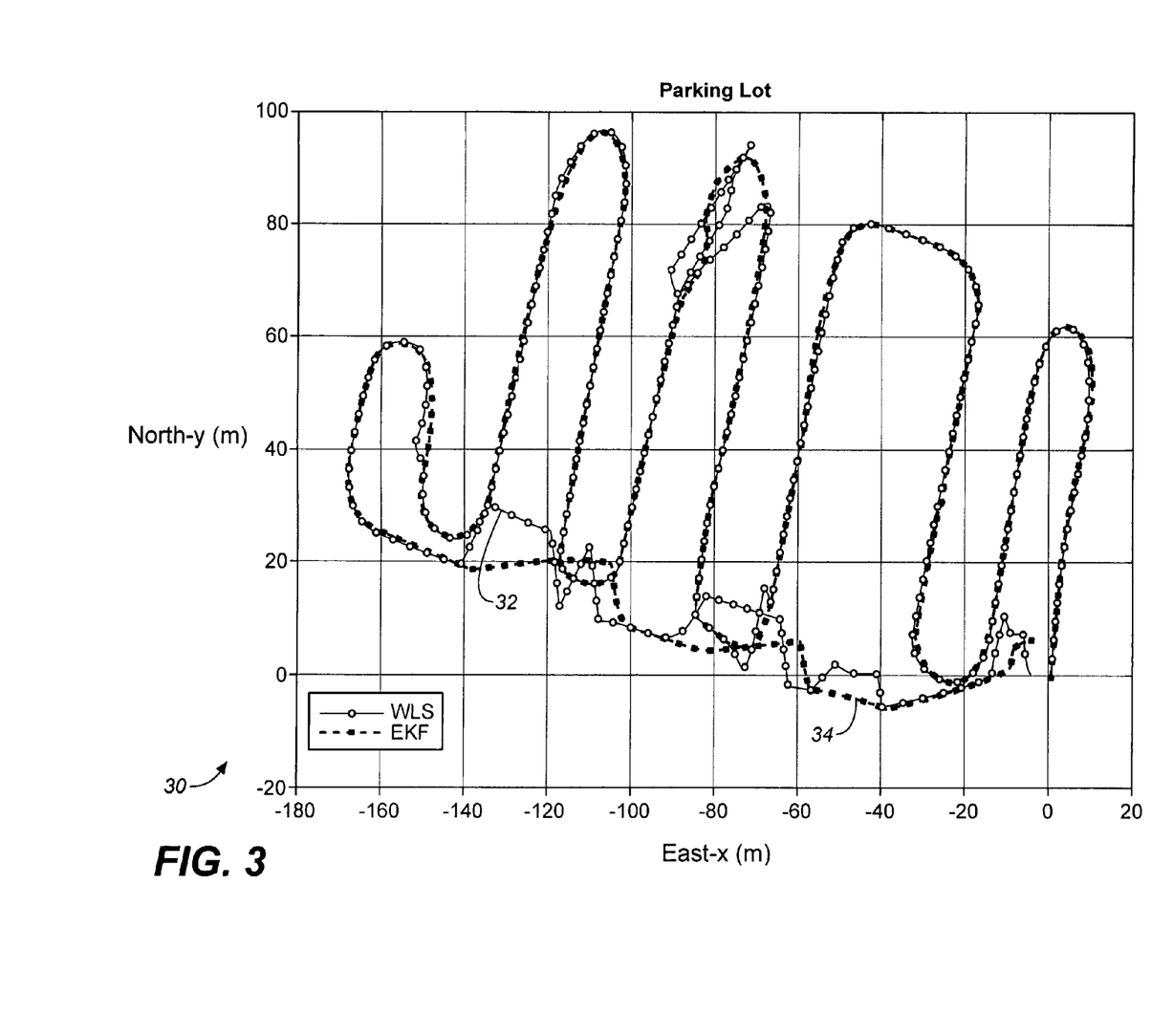
FIG. 3 depicts the WLS and EKF trajectories with their reactions to constellation changes.

In an embodiment of the technology, FIGS. 2 & 3 illustrates the problem in a dynamic situation. The run consists of a drive through a parking lot that contains trees and a couple of structures.

In an embodiment of the technology, more specifically, FIG. 2 20 shows the satellite count 22 during the drive. FIG. 3 30 illustrates the WLS 34 and EKF 32 trajectories with their reactions to constellation changes due to two types of events.

The first event (a single satellite event) is due to the satellite constellation changes originated by gaining or/and losing a single satellite.

The second event (a single differential event) can be due to a sudden loss or gain of a differential correction signal.

In an embodiment of the technology, the second event (a single differential event) is due to a sudden loss or gain of a differential correction signal originated from a Base Station, or from a Virtual Reference Base Station (VRS) which is further referred to as: a differential signal ON; or a differential signal OFF.

In another embodiment of the technology, the second event (a single differential event) is due to a sudden loss or gain of a differential correction signal originated from WAAS.

WAAS generates two types of differential corrections: fast and slow. The fast corrections are designed for errors which are changing rapidly and primarily concern the GPS satellites' instantaneous positions and clock errors. On the other hand, the slow corrections include long-term ephemeris and clock error estimates, as well as ionospheric delay information.

In an embodiment of the technology, a user can start receiving a slow differential correction from WAAS (a differential signal ON level 1), or stop receiving it (a differential signal OFF level 1).

In an embodiment of the technology, a user can start receiving a fast differential correction from WAAS (a differential signal ON level 2), or stop receiving it (a differential signal OFF level 2).

In an embodiment of the technology, a user can start receiving both a slow & fast differential corrections from WAAS (a differential signal ON level 1 & a differential signal ON level 2), or stop receiving both corrections (a differential signal OFF level 1 & a differential signal OFF level 2).

In an embodiment of the technology, if user employs a radio receiver, implementing the WLS position solution, the WLS reacts with a position bias in the form of an instantenous jump in an unbiased position solution when at least one of the above mentioned detectable events occurs. Thus, a WLS initially unbiased position solution becomes a biased position solution if at least one of the above mentioned detectable events occurs.

In an embodiment of the technology, if user employs a radio receiver, implementing the Kahnan Filter (KF), the KF solution does not respond instantaneously to any of the detectable events. Instead, KF unbiased solution drifts toward the new biased solution over the course of several Epochs.

Because of the different natures of the reactions of WLS and KF to constellation and differential signal change events, two different algorithms to achieve position bias elimination were developed.

In an embodiment of the technology, if user employs a radio receiver implementing the WLS position solution, an algorithm called Position Bias Filter (PBF) that performs direct bias elimination in the position domain is implemented. On the other hand, if user employs a radio receiver implementing KF, a position domain implementation is not appropriate since KF position biases appear in the form of drifts over the course of several Epochs, making it difficult to assess the biases during these Epochs.

In an embodiment of the technology, if user employs a radio receiver implementing KF, another algorithm, named Pseudo Range Bias Filter (PRBF), that performs the position bias elimination, indirectly, in the pseudo range domain, is introduced. The position bias calculation and elimination were done in ECEF coordinate system for both WLS-PBF and PRBF-Extended Kalman Filter (EKF) models.

It is worth mentioning that removing a position bias leads to a better relative accuracy in a position solution, but may not necessarily lead to more accurate positioning in the absolute sense. For instance, a bias caused by gaining a new satellite might result in a "biased" solution that is closer to the true position solution than an "unbiased" one. However, in many applications to achieve an adequate relative accuracy relative to a selected initial Epoch (including an initial satellite constellation and an initial differential correction signal) is more important than to achieve an absolute accuracy. We are focusing on these applications.

For instance, in agricultural (AG) applications, where large and heavy vehicles are trying to maintain straight and parallel lines over long distances, the relative position biases cause the vehicle to divert from its designated path leading to less efficient use of the land. The relative position biases presumably are also safety hazards to the vehicle and operator. Thus, elimination of relative position biases will lead to a more efficient use of the land. On the other hand, elimination of absolute position biases in AG applications could lead to a less accurate solution in the absolute sense.

In an embodiment of the technology, the PBF algorithm comprises two parts: the update algorithm and the correction algorithm.

In an embodiment of the technology, the update algorithm which is activated only when a detectable event occurs calculates a position bias vector when an event occurs by accumulating the position bias vector with preceding ones.

In an embodiment of the technology, the correction algorithm takes place every Epoch, during which the accumulated position bias is removed from the WLS position solution.

In an embodiment of the technology, more specifically, the update algorithm calculates the net instantaneous position bias vector δx caused by a detectable event, and accumulates it with the previously calculated event bias vectors. When triggered by a detectable event, the calculation of the instantaneous net position bias vector δx is done by running, at the same Epoch, two WLS solution operations, one before the event changes take place and one after, as follows:

$$\Delta x^{after} = (H^{after^T} W^{after} H^{after})^{-1} H^{after^T} W^{after} \cdot \Delta \rho^{after} \quad (1)$$

$$\Delta x^{before} = (H^{before^T} W^{before} H^{before})^{-1} H^{before^T} W^{before} \cdot \Delta \rho^{before}, \quad (2)$$

where: $\Delta x$=position offset; H=directional cosine matrix; W=pseudo range weight matrix; $\Delta \rho$=pseudo range offset.

Equations (1) and (2) are the common linearized WLS solution formulas. For the reference, please, see E. D. Kaplan and C. J. Hegarty. Understanding GPS, Principles and Applications, $2^{nd}$ Edition, 2006 Artech House Inc. Section 2.4.2 pp. 54-57 and section 7.3.3 pp. 333.

The net instantaneous bias due to the event is obtained by taking the difference between the position offsets:

$$\delta x = \Delta x^{after} - \Delta x^{before} \quad (3)$$

This operation is done in the same Epoch so that the event position bias is isolated from the user's position displacement due to its movement.

Then, the newly calculated position bias vector ax is added to the previously accumulated position bias vectors $\Sigma \delta x_{old}$ to produce an updated bias vector $\Sigma \delta x$:

$$\Sigma \delta x = \delta x + \Sigma \delta x^{old} \quad (4)$$

After the accumulation is done the designated initial position of the user is further referred to as the "truth".

In an embodiment of the technology, more specifically, the correction process takes place every Epoch, whether an event occurs or not, in order to continuously produce a bias free position trajectory. In this step, the accumulated position bias vector $\Sigma \delta x$ gets subtracted from the WLS solution position vector $x^{WLS}$ to produce a corrected WLS position vector $$x^{corrected}_{WLS}$$

that is free from all previous biases. The following equation summarizes the correction process:

$$x^{corrected\ WLS} = x^{WLS} - \sum \delta x \quad (5)$$

Figure 4:
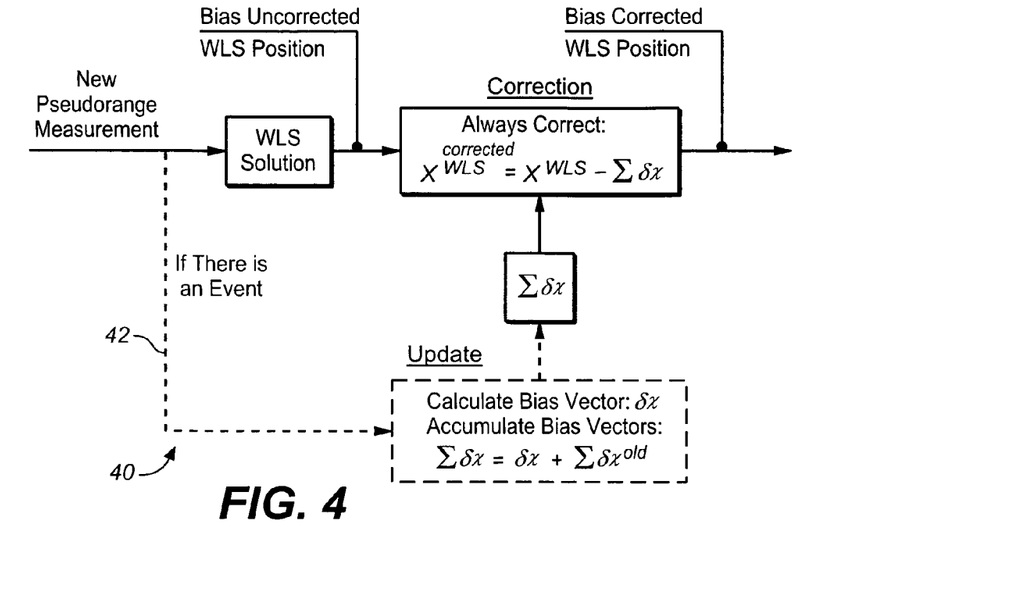
FIG. 4 shows a block diagram of WLS-PBF algorithm.

FIG. 4 illustrates the block diagram 40 of the WLS-PBF algorithm, wherein the update part of the algorithm 42 is drawn with dotted lines to underline the fact that an update takes place only when a detectable event occurs.

In an embodiment of the technology, removal of the position biases in a Kalman Filter (KF) solution is done indirectly in the pseudo range domain instead of the position domain, using a Pseudo Range Bias Filter (PRBF). The main concept behind PRBF is to calculate and accumulate pseudo range biases equivalent to the position bias vector of every event and correct the raw pseudo range measurements by removing from them these accumulated pseudo range biases, before they enter the KF as input. In this way, the KF, using corrected pseudo range measurements, produces a position solution that is position bias free. The PRBF also has an update process and a correction process.

In an embodiment of the technology, Pseudo Range Bias Filter (PRBF) uses an accumulation vector called the accumulated pseudo range bias vector $\Sigma \delta \rho$ which is a large vector, initialized at the beginning of the run that has an entry for every possibly tracked satellite in the constellation.

In an embodiment of the technology, if only GPS satellites are tracked, then, Σδρ could have 40 entries, whereas every satellite has a dedicated entry and the entry's number refers to the actual GPS satellite number. This way, the bookkeeping of the accumulated bias for every satellite is rightly done for the length of the run.

In an embodiment of the technology, similar to PBF, the update process in PRBF takes place only when at least one of the above mentioned detectable events occurs. However, we will differentiate between two types of bias causing events, so that the constellation changes and the differential signal changes are treated differently.

In an embodiment of the technology, for a constellation change event, which is hereinafter is referred to as "a detectable satellite event" the update process calculates the net instantaneous position bias vector δx, the same way as in the PBF case, by taking the difference between two same Epoch WLS solutions (see equations 1, 2 &3). Then, the update process maps (or converts) that position bias vector δx into equivalent pseudo range biases δρ using the linearized positioning equation (6) resulting in a pseudo range bias for each currently tracked satellite:

$$\delta\rho_N = H_N^t \cdot \delta x, \quad (6)$$

where N is the set of satellites in the current constellation of Epoch t. For the reference, please, see E. D. Kaplan and C. J. Hegarty. Understanding GPS, Principles and Applications, $2^{nd}$ Edition, 2006 Artech House Inc. Section 2.4.2 pp. 54-57 and section 7.3.3 pp. 333.

In an embodiment of the technology, for a differential signal change event, which is hereinafter referred to as "a detectable differential event", the PRBF update algorithm directly calculates the net instantaneous pseudo range biases δρ that causes a position bias, by simply taking the difference between the same Epoch's differentially corrected and differentially uncorrected pseudo ranges.

In an embodiment of the technology, for a detectable differential event, if a differential signal is gained, the PRBF update algorithm, executed in Epoch t, is as follows:

$$\delta\rho_N^t = \rho_{corrected}^t - \rho_{uncorrected}^t \quad (7)$$

In an embodiment of the technology, for a detectable differential event, if a differential signal is lost in Epoch t, the PRBF update algorithm is executed in Epoch t−1, is as follows:

$$\delta\rho_N^{t-1} = \rho_{uncorrected}^{t-1} - \rho_{corrected}^{t-1} \quad (8)$$

In an embodiment of the technology, for both gain and loss detectable differential events, each pseudo range bias in δp is appropriately added to the same satellite's entry in the accumulated pseudo range bias vector $\Sigma\delta\rho^{old}$. Since vectors δρ and Σδρ don't have the same size, the bias accumulation formula is loosely presented as follows:

$$\Sigma\delta\rho = \delta\rho_N + \Sigma\delta\rho^{old} \quad (9)$$

In an embodiment of the technology, the PRBF correction process is a step that takes place every Epoch whether a detectable event takes place or not. The pseudo range measurements get corrected by subtracting from them the corresponding biases extracted from the accumulated pseudo range bias vector, as follows:

$$\rho_N^{corrected} = \rho_N^{measured} - \sum_N \delta\rho \quad (10)$$

For example, for an Epoch with satellites set N (7 13 21 27 31), the correction formula is as follows:

$$\begin{bmatrix}\rho_7\\\rho_{13}\\\rho_{21}\\\rho_{27}\\\rho_{31}\end{bmatrix}^{pseudorange\ measurement} - \begin{bmatrix}\sum\delta\rho_7\\\sum\delta\rho_{13}\\\sum\delta\rho_{21}\\\sum\delta\rho_{27}\\\sum\delta\rho_{31}\end{bmatrix} = \begin{bmatrix}\rho_7\\\rho_{13}\\\rho_{21}\\\rho_{27}\\\rho_{31}\end{bmatrix}^{position\ bias\ corrected\ pseudorange\ measurement} \quad (11)$$

The corrected pseudo range measurements are input into KF algorithm as input measurements instead of the raw pseudo range measurements. So, basically, the position bias elimination would indirectly take place a priori, before the KF solution takes place. Any Kalman Filter (KF) can be combined with the PRBF algorithm as long as KF utilizes pseudo ranges in its measurement input.

Figure 5:
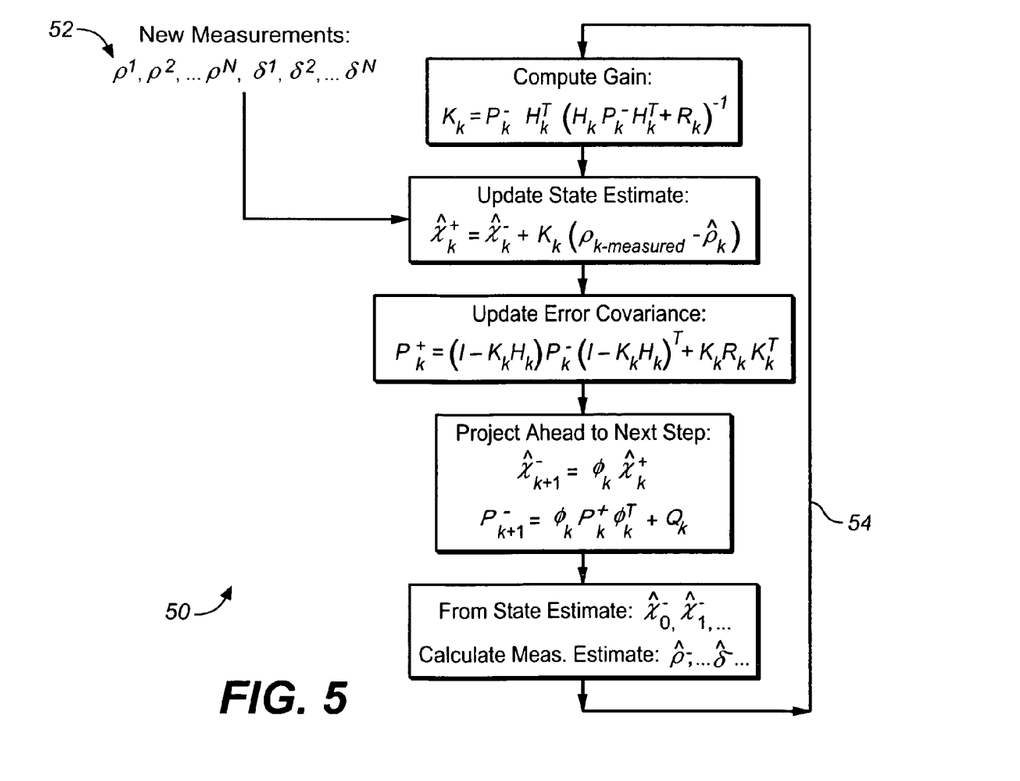
FIG. 5 illustrates a block diagram of EKF algorithm.

In an embodiment of the technology, FIG. 5 depicts a block diagram 50 of a stand-alone GPS 8-state Extended Kalman Filter (EKF). The state vector for the EKF model consists of three position error states, three velocity error states and receiver clock bias and drift states. The input 52 to the EKF is pseudo range and delta range measurements: ($\rho_1, \rho_2, \ldots \rho_N$, $\delta_1, \delta_2, \ldots \delta_N$). The EKF loop 54 of FIG. 5 is a standard loop and is presumed to be known to a person skillful in the art of satellite navigation. Please, see R. G. Brown and P. Y. C. Hwang, Introduction to Random Signals and Applied Kalman Filtering $3^{rd}$ Edition 1997, John Wiley & Sons. Section 11.5 pp. 437.

Figure 6:
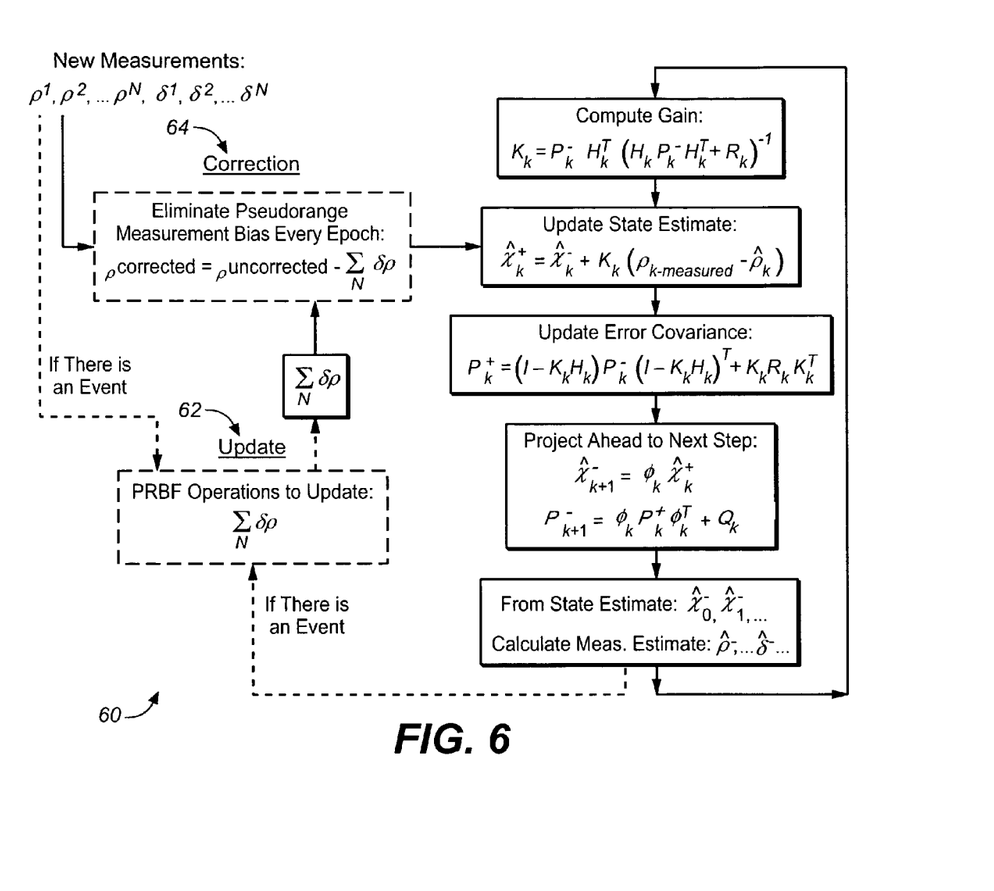
FIG. 6 is a block diagram of combined PRBF and the EKF algorithms.

In an embodiment of the technology, FIG. 6 shows the PRBF-EKF block diagram 60 whereas the PRBF algorithm is combined with the EKF algorithm. The update part 62 is drawn with dotted lines to underline the fact that an update occurs only when a detectable event takes place. When there is no detectable event takes place, the PRBF-EKF block diagram illustrates that the only process taking place is the correction process 64.

In an embodiment of the technology, because of the linear property of the positioning equations around the linearization point in both WLS and EKF solutions, the principle of superposition could be utilized to deal with the cases when a combination of single events occurs. The position or pseudo range biases caused by the single detectable events are separately calculated and then summed up to produce the resultant bias. The concept is summarized in the following equations:

$$\delta x = \delta x_{event\ 1} + \delta x_{event\ 2} + \delta x_{event\ 3} \quad (12)$$

$$\delta\rho = \delta\rho_{event\ 1} + \delta\rho_{event\ 2} + \delta\rho_{event\ 3} \quad (13)$$

In an embodiment of the technology, a single satellite event of one type (like a gain of a satellite or a loss of a satellite) and/or a differential correction event could take place at a single Epoch.

In an embodiment of the technology, at a single Epoch, multiple (two, or three, or more) single events could take place.

Overall, we will illustrate 11 possible event scenarios, 4 single event cases and 7 combinations of single events cases. For each such scenario, a specific update algorithm is disclosed, for both PBF and PRBF.

Case 1: Loss of Satellites with a Steady (On or Off) Differential Signal:

TABLE 1

| t−1 | t |
|---|---|
| 7 | 7 |
| 9 | — |
| 13 | 13 |
| 22 | — |
| 27 | 27 |
| 31 | 31 |

When one or more satellites are lost at the current Epoch t (see example in Table 1), two sets of satellites, D and C are formed, where D is the set at Epoch t−1: D (7 9 13 22 27 31); whereas C is the common set of satellites between Epochs T−1 &t: C (7 132731).

Using the pseudo range measurements and predictions at Epoch t−1 and using sets of satellites D and C, two WLS solutions at the same Epoch t−1 are generated:

$$\Delta x_D^{t-1} = (H_D^{t-1^T} W_D^{t-1} H_D^{t-1})^{-1} H_D^{t-1^T} W_D^{t-1} \cdot \Delta \rho_D^{t-1}$$

$$\Delta x_C^{t-1} = (H_C^{t-1^T} W_C^{t-1} H_C^{t-1})^{-1} H_C^{t-1^T} W_C^{t-1} \cdot \Delta \rho_C^{t-1}$$

Then, the net instantaneous position bias due to the satellite loss originated by transition between sets of satellites C and D is obtained:

$$\delta x_{loss} = \Delta x_C^{t-1} - \Delta x_D^{t-1}$$

For PBF, the accumulated position bias vector becomes:

$$\Sigma \delta x = \delta x_{loss} + \Sigma \delta x_{old}$$

For PRBF, the $\delta x_{loss}$ equivalent pseudo range biases for set of satellites C at Epoch t are computed as follows:

$$\delta \rho_{loss} = H_C^t \cdot \delta x_{loss}$$

Then, adding these biases $\delta \rho_{loss}$ to their appropriate counterparts in the previously accumulated pseudo range bias vector $\Sigma \delta \rho_{old}$ results in an accumulated pseudo range bias vector update as follows:

$$\Sigma \delta \rho = \delta \rho_{loss} + \Sigma \delta \rho_{old}$$

Case 2: Gain of Satellites with a Steady (On or Off) Differential Signal:

TABLE 2

| t−1 | t |
|---|---|
| 7 | 7 |
| 9 | 9 |
| 13 | 13 |
| — | 22 |
| 27 | 27 |
| — | 31 |

When one or more satellites are gained at the current Epoch t, (see example in Table 2), two sets of satellites N and C are formed: N is the current set of satellites at Epoch t: N (7 9 13 22 27 31), whereas C is the common set of satellites between Epoch t and Epoch t−1: C (7 9 13 27).

Using the measurements at the current Epoch t and their predictions, two WLS solutions are generated:

$$\Delta x_C^t = (H_C^{T} W_C^t H_C^t)^{-1} H_C^{T} W_C^t \cdot \Delta \rho_C^t$$

$$\Delta x_N^t = (H_N^{T} W_N^t H_N^t)^{-1} H_N^{T} W_N^t \cdot \Delta \rho_N^t$$

Now, the net instantaneous position bias due strictly to the satellites gain can be obtained:

$$\delta x_{gain} = \Delta x_N^t - \Delta x_C^t$$

For PBF, the accumulated position bias vector becomes:

$$\Sigma \delta x = \delta x_{gain} + \Sigma \delta x_{old}$$

For PRBF, the equivalent pseudo range biases of the satellite set N at time Epoch t, due to the satellites gain, is computed as follows:

$$\delta \rho_{gain} = H_N^t \cdot \delta x_{gain}$$

Then, adding these biases $\delta \rho_{gain}$ to their appropriate counterparts in the previously accumulated pseudo range bias vector $\Sigma \delta \rho_{old}$ results in an accumulated pseudo range bias vector update:

$$\Sigma \delta \rho = \delta \rho_{gain} + \Sigma \delta \rho_{old}$$

Case 3: Gain and Loss of Satellites with a Steady (On or Off) Differential Signal:

We assume that two distinct events, a gain of satellites and a loss of satellites

TABLE 3

| t − 1 | t |
|---|---|
| 7 | 7 |
| 9 | — |
| 13 | 13 |
| 22 | 22 |
| 27 | 27 |
| — | 31 | occurred at the same Epoch (see example in Table 3) so that the principal of superposition is applied. Two operations, one for the gained satellites and one for the lost satellites are separately conducted yielding two individual position bias vectors. The net total bias vector for this combination event is the sum of the two individual bias vectors.

Three sets of satellites: N, D and C are formed, whereas: N is the current satellite set at Epoch t: N (7 13 22 27 31), D is the satellite set at Epoch t−1: D (7 9 13 22 27), and C is the common satellite set between Epoch t−1 and Epoch t: C(7132227).

For the lost satellite, the bias vector is calculated exactly like in Case 1, using Epoch t−1 data.

Two WLS solutions, using sets D and C at Epoch t−1 are generated:

$$\Delta x_D^{t-1} = (H_D^{t-1^T} W_d^{t-1} H_D^{t-1})^{-1} H_D^{t-1^T} W_D^{t-1} \cdot \Delta \rho_D^{t-1}$$

$$\Delta x_C^{t-1} = (H_C^{t-1^T} W_C^{t-1} H_C^{t-1})^{-1} H_C^{t-1^T} W_C^{t-1} \cdot \Delta \rho_C^{t-1}$$

Then, the net instantaneous position bias due strictly to this satellite loss is obtained:

$$\delta x_{loss} = \Delta x_C^{t-1} - \Delta x_D^{t-1}$$

For PRBF, the equivalent pseudo range biases, due to the satellite loss, of the C set at Epoch t are computed:

$$\delta \rho_{loss} = H_C^t \cdot \delta x_{loss}$$

For the gained satellite, the bias vector is calculated exactly like in Case 2, using Epoch t data. Sets of satellites C and N, at time Epoch t, are used to generate the two WLS solutions:

$$\Delta x_C^t = (H_C^{T} W_C^t H_C^t)^{-1} H_C^{T} W_C^t \cdot \Delta \rho_C^t$$

$$\Delta x_N^t = (H_N^{T} W_N^t H_N^t)^{-1} H_N^{T} W_N^t \cdot \Delta \rho_N^t$$

Now, the net instantaneous position bias due strictly to the satellite gain can be obtained:

$$\delta x_{gain} = \Delta x_N^t - \Delta x_C^t$$

For PRBF, the equivalent pseudo range biases, due to the satellite gain, for the satellites set N at Epoch t are computed:

$$\delta \rho_{gain} = H_N^t \cdot \delta x_{gain}$$

For PBF, the position bias vectors are added to the accumulated position bias vector:

$$\Sigma \delta x = \delta x_{loss} + \delta x_{gain} + \Sigma \delta x_{old}$$

For PRBF, we appropriately add the pseudo range biases of both events to their counterparts in the previously accumulated pseudo range bias vector:

$$\Sigma \delta \rho = \delta \rho_{loss} + \delta \rho_{gain} + \Sigma \delta \rho_{old}$$

For the following cases, where a differential signal event is involved, the letters u and u, c appear at the bottom of the example tables. u means only the differentially uncorrected pseudo range measurements are present while u, c means both corrected and uncorrected measurements are present.

Case 4: Differential Signal Gain with a Steady Constellation:

TABLE 4

| t − 1 | t |
|---|---|
| 7 | 7 |
| 9 | 9 |
| 13 | 13 |
| 22 | 22 |
| 27 | 27 |
| u | u, c |

For PBF:
Two WLS solutions at Epoch t are generated, using the differentially corrected and uncorrected pseudo range measurements:

$$\Delta x_{C\,uncorr.}^t = (H_C^{t^T} W_C^t H_C^t)^{-1} H_C^{t^T} W_C^t \cdot \Delta \rho_C^t$$

$$\Delta x_{C\,corr.}^t = (H_C^{t^T} W_C^t H_C^t)^{-1} H_C^{t^T} W_C^t \cdot \Delta \rho_C^t$$

The instantaneous position bias vector would then be:

$$\delta x_{diff.} = \Delta x_{C\,corr.}^t - \Delta x_{C\,uncorr.}^t$$

Then, the accumulated position bias vector would be updated:

$$\Sigma \delta x = \delta x_{diff.} + \Sigma \delta x_{old}$$

For PRBF:
Since at time t, (see Table 4) both the corrected and uncorrected pseudo range measurements are present, the instantaneous pseudo range biases, for common satellite set C, due to the differential signal gain can be directly obtained:

$$\delta \rho_{C\,diff.}^t = \rho_{C\,corrected}^t{}_{differentially} - \rho_{C\,uncorrected}^t{}_{differentially}$$

Then, the accumulated pseudo range vector would be updated:

$$\Sigma \delta \rho = \delta \rho_{diff.} + \Sigma \delta \rho_{old}$$

It should be mentioned that the solution would still benefit from gaining the differential signal, but the initial bias due to this gain gets eliminated.

Case 5: Differential Signal Loss with a Steady Constellation:

TABLE 5

| t − 1 | t |
|---|---|
| 7 | 7 |
| 9 | 9 |
| 13 | 13 |
| 22 | 22 |
| 27 | 27 |
| c, u | u |

For PBF:
Two WLS solutions at Epoch t are generated, using the differentially corrected and uncorrected pseudo range measurements:

$$\Delta x_{C\,corr.}^{t-1} = (H_C^{t-1^T} W_C^{t-1} H_C^{t-1})^{-1} H_C^{t-1^T} W_C^{t-1} \cdot \Delta \rho_C^{t-1}$$

$$\Delta x_{C\,uncorr.}^{t-1} = (H_C^{t-1^T} W_C^{t-1} H_C^{t-1})^{-1} H_C^{t-1^T} W_C^{t-1} \cdot \Delta \rho_C^{t-1}$$

The instantaneous position bias vector is as follows:

$$\delta x_{diff.} = \Delta x_{C\,uncorr.}^{t-1} - \Delta_{C\,corr.}^{t-1}$$

Then, the accumulated position bias vector is updated as follows:

$$\Sigma \delta x = \delta x_{diff.} + \Sigma \delta x_{old}$$

For PRBF:
At time Epoch−1, (see Table 5) since both the corrected and uncorrected pseudo range measurements are present, the instantaneous pseudo range biases, for current satellite set C, due to the differential signal loss can be directly obtained:

$$\delta \rho_{C\,diff.}^{t-1} = \rho_{C\,uncorrected}^{t-1}{}_{differentially} - \rho_{C\,corrected}^{t-1}{}_{differentially}$$

Then, the accumulated pseudo range vector is updated as follows:

$$\Sigma \delta \rho = \delta \rho_{diff.} + \Sigma \delta \rho_{old}$$

Case 6: Differential Signal Gain and Satellites Loss:
This case is a combination of Case 1 and Case 4.

TABLE 6

| t-1 | t |
|---|---|
| 7 | 7 |
| 9 | — |
| 13 | 13 |
| 22 | — |
| 27 | 27 |
| 31 | 31 |
| u | u, c |

For PBF (using Table 6 as an example):
For the differential signal gain:

$$\delta x_{diff.} = \Delta x_{C\,corr.}^t - \Delta x_{C\,uncorr.}^t$$

For the satellite loss:

$$\delta x_{loss} = \Delta x_C^{t-1} - \Delta x_D^{t-1}$$

Applying superposition and accumulating:

$$\Sigma \delta x = \delta x_{diff.} + \delta x_{loss} + \Sigma \delta x_{old}$$

For PRBF (using Table 6 as an example):
For the differential signal gain:

$$\delta\rho^t_{C\,diff.} = \rho^t_{C\,differentially\,corrected} - \rho^t_{C\,differentially\,uncorrected}$$

For the satellite loss:

$\delta\rho_{loss} = H_C{}^t \cdot \delta x_{loss}$

Applying superposition and accumulating:

$\Sigma\delta\rho = \delta\rho_{diff.} + \delta\rho_{loss} + \Sigma\delta\rho_{old}$ Case 7: Differential Signal Gain and Satellites Gain:
This case is a combination of Case 2 and Case 4.

TABLE 7

```
t-1    t
 7     7
 9     9
13    13
—     22
27    27
—     31
 u    u, c
```

For PBF (using Table 7 as an example):

$\delta x_{diff.} = \Delta x_{N\,corr.}{}^t - \Delta x_{N\,uncorr.}{}^t$

Using differentially uncorrected measurements at time t:

$\delta x_{gain} = \Delta x_N{}^t - \Delta x_C{}^t$ $\Sigma\delta x = \delta x_{diff.} + \delta x_{gain} + \Sigma\delta x_{old}$ For PRBF (using Table 7 as an example):
For the differential signal gain:

$$\delta\rho^t_{N\,diff.} = \rho^t_{N\,differentially\,corrected} - \rho^t_{N\,differentially\,uncorrected}$$

For the satellite gain:

$\delta\rho_{gain} = H_N{}^t \cdot \delta x_{gain}$ $\Sigma\delta\rho = \delta\rho_{diff.} + \delta\rho_{gain} + \Sigma\delta\rho_{old}$ Case 8: Differential Signal Loss and Satellites Loss:
This case is a combination of Case 1 and Case 5.

TABLE 8

```
 t-1    t
  7     7
  9     —
 13    13
 22     —
 27    27
 31    31
 c, u   u
```

For PBF (using Table 8 as an example):

$\delta x_{diff.} = \Delta x_{C\,uncorr.}{}^{t-1} - \Delta x_{C\,corr.}{}^{t-1}$ $\delta x_{loss} = \Delta x_C{}^{t-1} - \Delta x_D{}^{t-1}$ $\Sigma\delta x = \delta x_{diff.} + \delta x_{loss} + \Sigma\delta x_{old}$ For PRBF (using Table 8 as an example):

$$\delta\rho^{t-1}_{C\,diff.} = \rho^{t-1}_{C\,differentially\,uncorrected} - \rho^{t-1}_{C\,differentially\,corrected}$$

$\delta\rho_{loss} = H_C{}^t \cdot \delta x_{loss}$ $\Sigma\delta\rho = \delta\rho_{diff.} + \delta\rho_{loss} + \Sigma\delta\rho_{old}$ Case 9: Differential Signal Loss and Satellites Gain:
This case could be considered a combination of Case 2 and Case 5.

TABLE 9

```
t-1    t
 7     7
 9     9
13    13
—     22
27    27
—     31
 cu    u
```

For PBF (using Table 9 as an example):

$\delta x_{diff.} = \Delta x_{C\,uncorr.}{}^{t-1} - \Delta x_{C\,corr.}{}^{t-1}$ $\delta x_{gain} = \Delta x_N{}^t - \Delta x_C{}^t$ $\Sigma\delta x = \delta x_{diff.} + \delta x_{gain} + \Sigma\delta x_{old}$ For PRBF (using Table 9 as an example):

$$\delta\rho^{t-1}_{C\,diff.} = \rho^{t-1}_{C\,differentially\,uncorrected} - \rho^{t-1}_{C\,differentially\,corrected}$$

$\delta\rho_{gain} = H_N{}^t \cdot \delta x_{gain}$ $\Sigma\delta\rho = \delta\rho_{diff.} + \delta\rho_{gain} + \Sigma\delta\rho_{old}$ Case 10: Differential Signal Gain and Satellites Gain & Loss:
This case is a combination of Case 3 and Case 4.

TABLE 10

| t − 1 | t |
|---|---|
| 7 | 7 |
| 9 | — |
| 13 | 13 |
| 22 | 22 |
| 27 | 27 |
| — | 31 |
| u | u, c |

For PBF (using Table 10 as an example):

$\delta x_{diff.} = \Delta x_{N\,corr.}{}^t - \Delta x_{N\,uncorr.}{}^t$ $\delta x_{loss} = \Delta x_C{}^{t-1} - \Delta x_D{}^{t-1}$ $\delta x_{gain} = \Delta x_N{}^t - \Delta x_C{}^t$ $\Sigma\delta x = \delta x_{diff.} + \delta x_{loss} + \delta x_{gain} + \Sigma\delta x_{old}$ For PRBF (using Table 10 as an example):

$$\delta \rho^t_{N\,diff.} = \rho^t_{N\,differentially \atop corrected} - \rho^t_{N\,differentially \atop uncorrected}$$

$$\delta \rho_{loss} = H_C^t \cdot \delta x_{loss}$$

Using uncorrected measurements:

$$\delta \rho_{gain} = H_N^t \cdot \delta x_{gain}$$

$$\Sigma \delta \rho = \delta \rho_{diff.} + \delta \rho_{loss} + \delta \rho_{gain} + \Sigma \delta \rho_{old}$$

Case 11: Differential Signal Loss and Satellites Gain & Loss:

This case is a combination of Case 3 and Case 5.

TABLE 11

| t − 1 | t |
|-------|---|
| 7     | 7 |
| 9     | — |
| 13    | 13 |
| 22    | 22 |
| 27    | 27 |
| —     | 31 |
| u, c  | u |

For PBF (using Table 11 as an example):

$$\delta x_{diff.} = \Delta x_{C\,uncorr.}^{t-1} - \Delta x_{C\,corr.}^{t-1}$$

$$\delta x_{loss} = \Delta x_C^{t-1} - \Delta x_D^{t-1}$$

$$\delta x_{gain} = \Delta x_N^t - \Delta x_C^t$$

$$\Sigma \delta x = \delta x_{diff.} + \delta x_{loss} + \delta x_{gain} + \Sigma \delta x_{old}$$

For PRBF (using Table 11 as an example):

$$\delta \rho_{diff.} = \rho^{t-1}_{C\,differentially \atop uncorrected} - \rho^{t-1}_{C\,differentially \atop corrected}$$

$$\delta \rho_{loss} = H_C^t \cdot \delta x_{loss}$$

$$\delta \rho_{gain} = H_N^t \cdot \delta x_{gain}$$

$$\Sigma \delta \rho = \delta \rho_{diff.} + \delta \rho_{loss} + \delta \rho_{gain} + \Sigma \delta \rho_{old}$$

Since the WLS technique is extensively used in both PBF and PRBF; there should be a minimum of four common satellites between the current and the previous Epochs. When only three common satellites are present, an extra satellite is added at the center of the Earth to make the PBF's and PRBF's implementations possible.

Tests with both stationary and moving receivers were conducted. A stationary spot and a parking lot, where a lot of trees and foliage exist, were selected for the tests. The receiver's firmware is capable of delivering WLS, WLS-PBF, EKF or PRBF-EKF and RTK solutions simltaneously, autonomous or with WAAS. Matlab simulations of EKF and PRBF-EKF were used to see simultaneous results and to see the effect of different tunnings of the Kalman filter.

Figure 7:
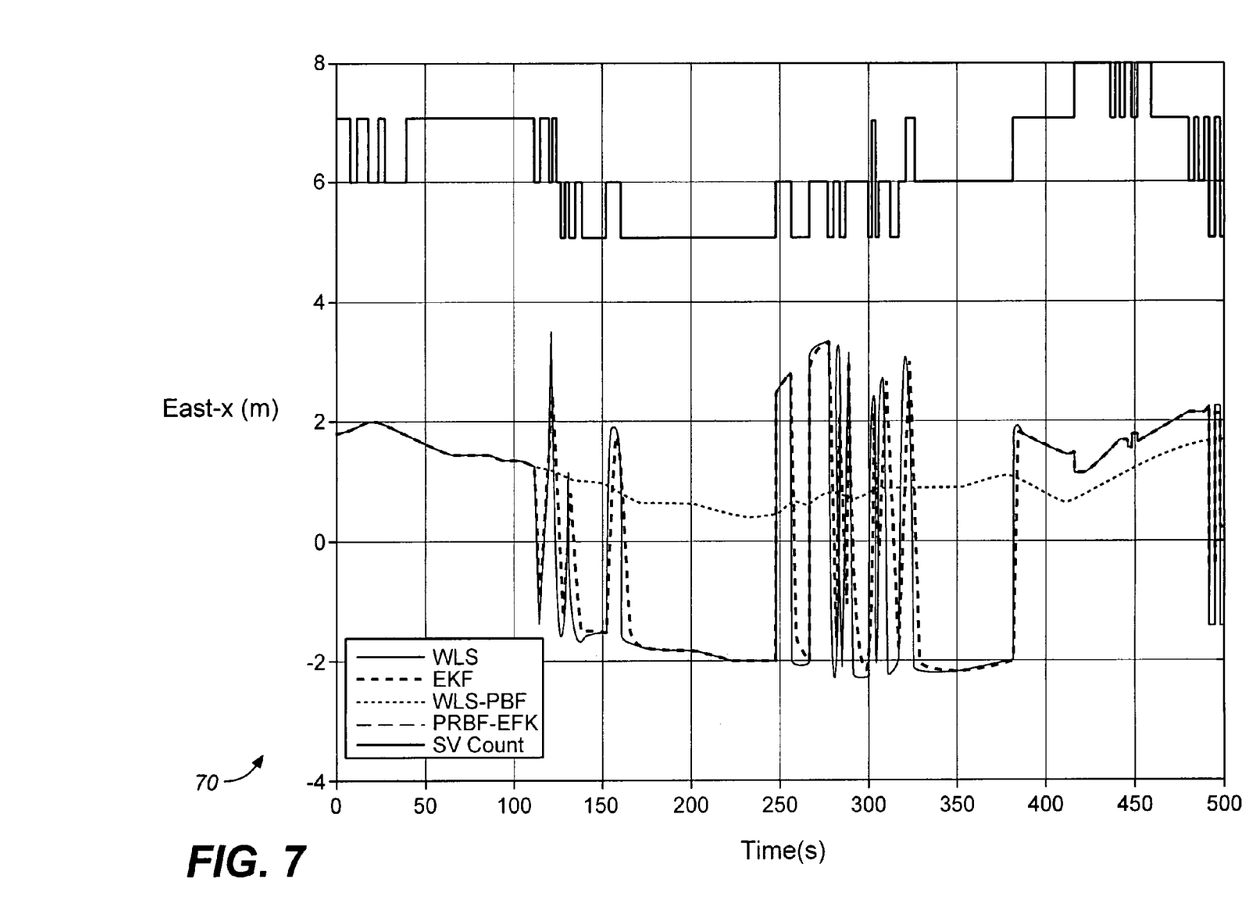
FIG. 7 illustrates a test for a user employing a stationary receiver running both WLS-PBF and PRBF-EKF algorithms.

In the stationary receiver case 70, running WLS-PBF and PRBF-EKF resulted in totally eliminating the position biases and were closely similar, as shown in FIG. 7. WLS-PBF and PRBF-EKF trajectories came out extremely similar.

Figure 8:
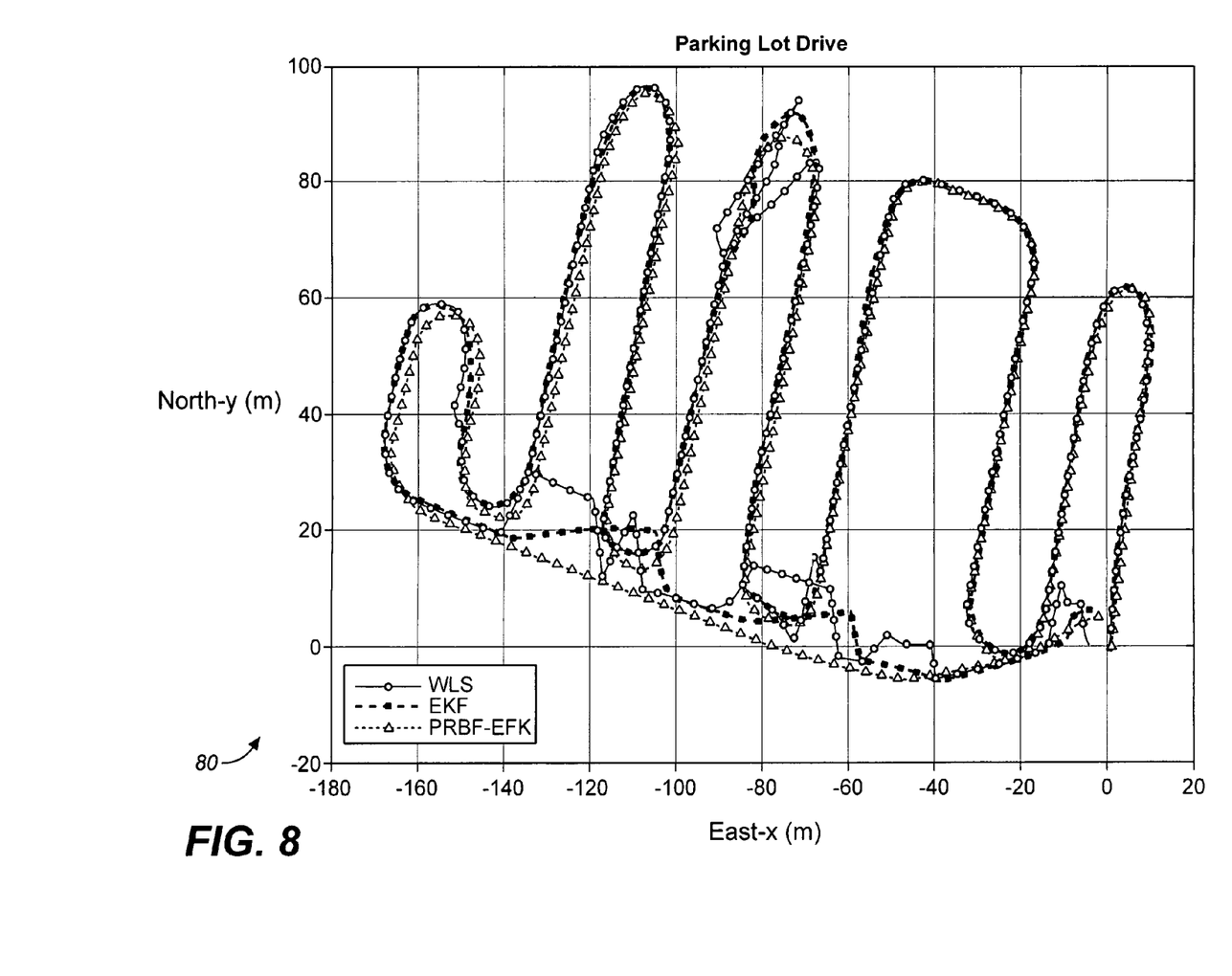
FIG. 8 shows a user performing a driving test while employing a receiver running both WLS-PBF and PRBF-EKF algorithms.
Figure 9:
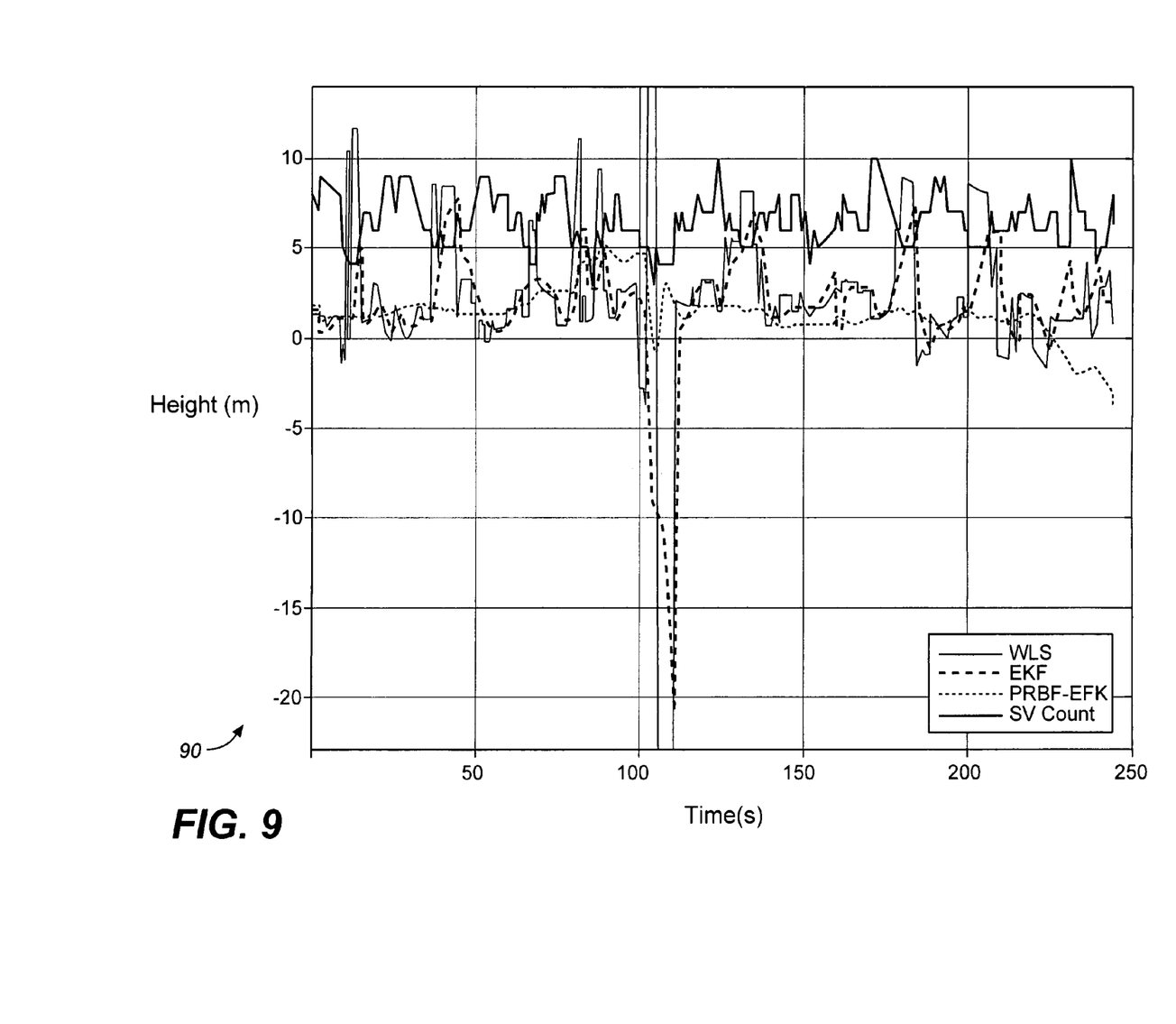
FIG. 9 illustrates a user performing a driving test for height trajectories while employing a receiver running both WLS-PBF and PRBF-EKF algorithms.

In the driving test 80, depicted in FIG. 8, both PRBF-EKF and WLS-PBF North-East trajectories were very similar in eliminating all biases. Also significant improvement was observed for the height trajectory 90 as illustrated in FIG. 9.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for eliminating user position biases caused by satellite constellation changes or differential signal gain/loss comprising:
   (A) determining an unbiased user's position by using a radio receiver, wherein said unbiased user's position is determined by using an "initial transmitter constellation";
   (B) detecting a "detectable event" by using said radio receiver, wherein said detectable event causes a bias relative to said initially unbiased user's position, and wherein said detectable event transitions said initial transmitter constellation into a "biased transmitter constellation";
   (C) measuring the bias caused by said detectable event; wherein said bias is selected from the group consisting of: {a position bias; and a pseudo range bias};

(D) performing an update process by accumulating each said bias caused by at least one said detectable event to generate an accumulated bias; and (E) eliminating said accumulated bias at each Epoch by using a correction process.

2. The method of claim 1, wherein said step (A) further comprises:

(A1) selecting said "initial transmitter constellation" from the group consisting of: {GPS; GLONASS; combined GPS/GLONASS; GALILEO; COMPASS (Beidou Navigation System); Global Navigational Satellite System (GNSS); a pseudolite transmitter; a Base Station; a Virtual Reference Base Station (VRS); and Wide Area Augmentation System (WAAS)}.

3. The method of claim 1, wherein said step (B) further comprises:

(B1) selecting said detectable event from the group consisting of: {a change in initial satellite constellation of observable positioning satellites in said initial transmitter constellation; a change in an initial pseudolite constellation of observable pseudolite transmitters in said initial transmitter constellation; and a detectable change in a differential signal}.

4. The method of claim 3, wherein said step (B1) further comprises:

(B1, 1) selecting said change in said differential signal from the group consisting of: {a differential signal ON; a differential signal OFF; a differential signal ON level 1; a differential signal OFF level 1; a differential signal ON level 2; and a differential signal OFF level 2}; and wherein said {a differential signal ON, a differential signal OFF} detectable changes in said differential signal are originated by a differential signal selected from the group consisting of: {a Base Station; a Virtual Base station; and a Coast Guard Beacon system}; and wherein said {a differential signal ON level 1; a differential signal OFF level 1; a differential signal ON level 2; and a differential signal OFF level 2} detectable changes in said differential signal are originated by a differential signal selected form the group consisting of: {a slow correction originated by a WAAS satellite; a fast correction originated by a WAAS satellite; and slow & fast correction originated by a WAAS satellite}.

5. The method of claim 1, wherein said step (C) further comprises:

(C1) if said user's position is calculated by using a method selected from the group consisting of: {a Weighted Least Squares (WLS) method; and a Least Squares (LS) method}, calculating in a position domain said user's position bias associated with said event.

6. The method of claim 5, wherein said step (C1) further comprises:

(C1, 1) calculating said user's instantaneous position bias vector associated with said event in a position domain by using said user's biased position associated with said event and by using said user's unbiased position calculated before said event occurred.

7. The method of claim 5, wherein said step (D) further comprises:

(D1) performing said update process by accumulating each said instantaneous position bias vector resulted from at least one said event into a single accumulated position bias vector.

8. The method of claim 5, wherein said at least one detectable event comprises a superposition of said two single satellite events, said step (D) further comprises:

(D4) performing said update process by adding each said single accumulated position bias vector to generate a total accumulated position bias vector.

9. The method of claim 1, wherein said step (C) further comprises:

(C2) if said user's position is calculated by using a method selected from the group consisting of: {a Kalman Filter (KF) method; a Position-Velocity estimator method; and a Linear Position-Velocity estimator method}, calculating in a pseudo range domain said user's pseudo range bias associated with said event.

10. The method of claim 9, if said user's position is calculated by using a Kalman Filter (KF) method, and if said event is a single "satellite event" selected from the group consisting of: {a change in an initial constellation of observable positioning satellites in said initial transmitter constellation; and a change in an initial constellation of observable pseudolite transmitters in said initial transmitter constellation}, said step (C2) further comprising:

(C2, 1) calculating said user's instantaneous position bias vector associated with said single current satellite event in a position domain by using said method selected from the group of methods consisting of: {said Weighted Least Squares (WLS) method; and said Least Squares (LS) method}; and (C2, 2) mapping said instantaneous position bias vector into an equivalent instantaneous pseudo range bias vector associated with said single current satellite event.

11. The method of claim 9, if said user's position is calculated by using said Kalman Filter (KF) method, and if said event is said single satellite event, said step (D) further comprising:

(D2) performing said update process by accumulating each said equivalent instantaneous pseudo range bias vector into a single satellite accumulated pseudo range bias vector for each prior single satellite event that occurred prior to said current single satellite event.

12. The method of claim 9, if said user's position is calculated by using said Kalman Filter (KF) method, and if said event is a single "differential" event selected from the group consisting of: {differential signal ON; differential signal OFF; differential signal ON level 1; differential signal OFF level 1; differential signal ON level 2; and differential signal OFF level 2}; said step (C2) further comprising:

(C2, 3) calculating in a pseudo range domain said user's instantaneous pseudo range bias vector associated with said single differential event by using said user's biased pseudo range associated with said single differential event and by using said user's unbiased pseudo range calculated before said single differential event occurred.

13. The method of claim 9, if said user's position is calculated by using said Kalman Filter (KF) method, and if said event is said single differential event, said step (D) further comprising:

(D3) performing said update process by accumulating each said instantaneous pseudo range bias vector into a single differential accumulated pseudo range bias vector for each prior single differential event that occurred prior to said current single differential event.

14. The method of claim 9, wherein said at least one detectable event comprises a superposition of said two single satellite events, said step (D) further comprises:

(D5) performing said update process by adding each said single satellite accumulated pseudo range bias vector to generate a total accumulated pseudo range bias vector.

15. The method of claim 9, wherein said at least one detectable event comprises a superposition of said single satellite event and said single differential event, said step (D) further comprises:
- (D6) performing said update process by adding said single satellite accumulated pseudo range bias vector and said single differential accumulated pseudo range bias vector to generate a total accumulated pseudo range bias vector.

16. The method of claim 9, wherein said at least one detectable event comprises a superposition of said two single satellite events and said single differential event, said step (D) further comprises:
- (D6) performing said update process by adding said first single satellite accumulated pseudo range bias vector and said second single satellite accumulated pseudo range bias vector and said single differential accumulated pseudo range bias vector to generate a total accumulated pseudo range bias vector.

17. An apparatus for eliminating user position biases caused by satellite constellation changes or differential signal gain/loss comprising:
- (A) a radio receiver configured for determining an unbiased user's position, wherein said unbiased user's position is determined by using an "initial transmitter constellation";
- (B) a means for detecting a "detectable event", wherein said detectable event causes a bias relative to said initially unbiased user's position, and wherein said detectable event transitions said initial transmitter constellation into a "biased transmitter constellation";
- (C) a means for measuring the bias caused by said detectable event; wherein said bias is selected from the group consisting of: {a position bias; and a pseudo range bias};
- (D) a means for performing an update process by accumulating each said bias caused by at least one said detectable event to generate an accumulated bias; and
- (E) a means for eliminating said accumulated bias at each Epoch by using a correction process.

18. The apparatus of claim 17, wherein said radio receiver means (A) further comprises:
- (A1) a radio receiver means configured to receive a plurality of navigation radio signals emanating from said "initial transmitter constellation" selected from the group consisting of: {GPS; GLONASS; combined GPS/GLONASS; GALILEO; COMPASS (Beidou Navigation System); Global Navigational Satellite System (GNSS); a pseudolite transmitter; a Base Station; a Virtual Reference Base Station (VRS); and Wide Area Augmentation System (WAAS)}.

19. The apparatus of claim 17, wherein said means (B) further comprises:
- (B1) a computer means configured to detect said detectable event.

20. The apparatus of claim 17, wherein said means (C) further comprises:
- (C1) a computer means configured to calculate in a position domain said user's position bias associated with said detectable event if said user's position is calculated by using a method selected from the group consisting of: {a Weighted Least Squares (WLS) method; and a Least Squares (LS) method}.

21. The apparatus of claim 17, wherein said means (C) further comprises:
- (C2) a computer means configured to calculate in a pseudo range domain said user's pseudo range bias associated with said detectable event if said user's position is calculated by using a method selected from the group consisting of: {a Kalman Filter (KF) method; a Position-Velocity estimator method; and a Linear Position-Velocity estimator method}.

22. The apparatus of claim 17, wherein said means (D) further comprises:
- (D1) a computer means configured to implement said update process for a single event.

23. The apparatus of claim 17, wherein said means (D) further comprises:
- (D2) a superposition computer means configured to implement said update process for at least two single events.

24. The apparatus of claim 17, wherein said means (E) further comprises:
- (E1) a computer means configured to implement said correction process.

25. An article comprising: a storage medium having stored thereon instructions that, when executed, result in a computing platform having the capability to eliminate user position biases caused by satellite constellation changes or differential signal gain/loss by executing an algorithm further comprising:
- (A) determining an unbiased user's position by using a radio receiver, wherein said unbiased user's position is determined by using an "initial transmitter constellation";
- (B) detecting a "detectable event" by using said radio receiver, wherein said detectable event causes a bias relative to said initially unbiased user's position, and wherein said detectable event transitions said initial transmitter constellation into a "biased transmitter constellation".
- (C) measuring the bias caused by said detectable event; wherein said bias is selected from the group consisting of: {a position bias; and a pseudo range bias};
- (D) performing an update process by accumulating each said bias caused by at least one said detectable event to generate an accumulated bias; and
- (E) eliminating said accumulated bias at each Epoch by using a correction process.

* * * * *